US006074790A

United States Patent [19]
Venkateswar et al.

[11] Patent Number: 6,074,790
[45] Date of Patent: Jun. 13, 2000

[54] BLACK AND WHITE DEFECT CORRECTION FOR A DIGITAL MICROMIRROR PRINTER

[75] Inventors: Vadlamannati Venkateswar, Dallas, Tex.; Vivek Kumar Thakur, Karnataka, India

[73] Assignee: Texas Instruments Incorporated, Dallas, Tex.

[21] Appl. No.: 08/340,958

[22] Filed: Nov. 17, 1994

[51] Int. Cl.[7] .................................................. G06K 9/40
[52] U.S. Cl. .......................... 430/30; 345/149; 345/89; 345/90; 347/240; 382/264; 382/275
[58] Field of Search .................... 430/30, 22; 345/89, 345/90, 149; 382/264, 275; 358/463, 464; 347/240

[56] References Cited

U.S. PATENT DOCUMENTS

| | | | |
|---|---|---|---|
| 4,259,662 | 3/1981 | Yoshida | 382/273 |
| 4,348,100 | 9/1982 | Snelling | 355/14 R |
| 4,560,999 | 12/1985 | Tokuhara | 346/160 |
| 4,995,703 | 2/1991 | Noguchi | 359/59 |
| 5,028,939 | 7/1991 | Hornbeck et al. | 346/160 |
| 5,247,375 | 9/1993 | Mochizuki et al. | 359/54 |
| 5,339,093 | 8/1994 | Kumagai et al. | 345/149 |
| 5,406,213 | 4/1995 | Henley | 324/753 |
| 5,461,411 | 10/1995 | Florence et al. | 347/240 |

FOREIGN PATENT DOCUMENTS 5236358  9/1993  Japan .

*Primary Examiner*—Martin Angebranndt
*Attorney, Agent, or Firm*—Charles A. Brill; Wade James Brady, III; Frederick J. Telecky, Jr.

[57] ABSTRACT

A method for defect-correction printing. A spatial light modulator that is used to generate the image is mapped for defects. The ON defects are compensated by setting a background level that is equal to the cumulative exposure of the ON defects, and then this background level becomes the threshold for development by the electrophotographic process. The system compensates for OFF defects by allocating the bits and exposures necessary to approximate the OFF defects to operative elements, thereby keeping the cumulative exposure for that pixel in the final printed image exactly, or as closely as possible, equal to the desired exposure. The corrections are contained in a defect correction module (10) that generates the appropriate patterns with the correct allocations to minimize error.

1 Claim, 1 Drawing Sheet

BLACK AND WHITE DEFECT CORRECTION FOR A DIGITAL MICROMIRROR PRINTER

RELATED APPLICATIONS

U.S. patent application Ser. No. 08/475,156 filed Jun. 7, 1995

U.S. patent application Ser. No. 08/476,146 filed Jun. 7, 1995

U.S. patent application Ser. No. 08/482,054 filed Jun. 7, 1995

BACKGROUND OF THE INVENTION

1. Field of the Invention

This invention relates to printers, more particularly to spatial light modulator printers.

2. Background of the Invention

Spatial light modulators typically comprise an array of individually addressable elements, either reflective or transmissive. Examples of these are liquid crystal devices (LCD), digital micromirror devices (DMD, also known as deformable mirror devices), actuated mirror arrays, and magneto-optic crystals. These modulators have several uses, including printing.

Spatial light modulators are used in printing applications to form the image that will eventually be transferred to the photosensitive substrate, such as a spinning drum or moving plate. The image can be formed in many ways. One way is to form the line image on the modulator array so that the image of a line of print is produced upon the elements of the array, then the array is illuminated and the image is transferred by light onto the surface.

Time delay and integration techniques can also form the image on the photosensitive surface. These techniques cause a line of data to be displayed upon the array, then moved to the next line of the array as the drum or plate moves relative to the array, repeating until the area of the drum or plate being exposed is no longer adjacent the array. In this manner, the gray scale of the line is determined by the number of lines of exposure it receives as the drum or plate moves past.

One problem with the use of spatial light modulators is that in most cases every element of the array must be fully operational. The difficulty in manufacturing a 100% defect free array of thousands of elements can prohibit their wide spread use. Spatial light modulator elements have two principal defects. They can stick in the ON state, where light is always reflected or transmitted even when not desired, or they can stick in the OFF state, where light is never transmitted or reflected even when desired. A method of using spatial light modulators with defective elements would eliminate waste and lower the cost manufacturing.

SUMMARY OF THE INVENTION

A method of defect correction for printing using spatial light modulator arrays is set forth herein. Defects in a spatial light modulator array typically result in either an ON or OFF defect. OFF defects are caused by pixels in the array that are in the OFF state, not transferring any light to a photosensitive surface, and ON defects are pixels in the ON state, always transferring light to the photosensitive surface.

It is an advantage of the invention that the effect of these defects is minimized increasing the print resolution. The other elements in the array are used to compensate for the defect. In one embodiment, a background is generated equal to the ON defects that can by uniformly screened out in development. In another embodiment, OFF defects are compensated for with other elements in the array to most closely approximate the shading of the defective pixel.

It is a further advantage of the invention that it requires no additional processing power, very little extra time, and is transparent to the user.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
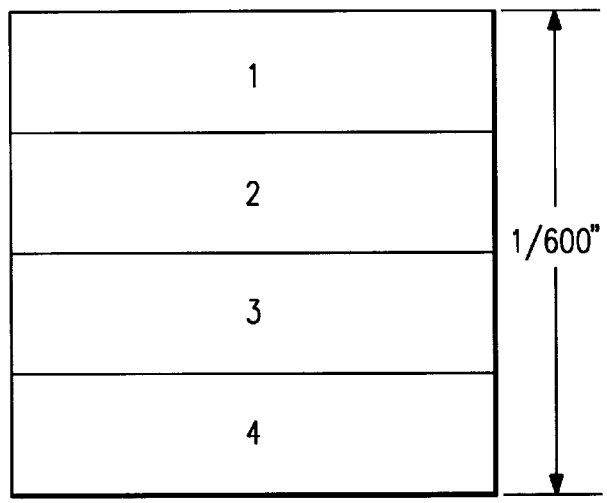
FIG. 1 shows a four-phase implementation of a spatial light modulator element.

Electrophotographic (EP) print engines have become very commonly known. In a typical application, the engine consists of a photosensitive drum which spins, a charging corona which charges the surface of the drum, a developer system (typically involving a toner supply and a fusing system) and some means for transferring an image to the surface of the drum. Other applications of EP principles can use film, printed circuit boards coated with a photosensitive matter, printing plates, etc. These photosensitive surfaces or substrates are typically moved past the imaging point on a conveyor or a belt.

One means for transferring light to the drum is a spatial light modulator array. These array normally have a grid of individually addressable elements that have at least two states, a transferring state and a non-transferring state. In the transferring state, the elements are addressed such that light that impinges upon them passes to the photosensitive surface, either by transmission through the element (such as LCD) or by reflection off of the device (such as DMD, and AMA). In the non-transferring state, the element is set such that light cannot pass to the photosensitive surface.

Most systems are set so that the transferring state is the one that actually forms the image. In this case, the light impinging the charged photosensitive surface causes the surface at that point to change to an opposite charge. The toner or other developer is then attracted to that point and not to the other parts, thereby forming the image. It is possible to have the toner oppositely charged, such that the image is formed by the non-transferring state, where the toner is attracted to those areas on the photosensitive surface that the light has not impinged. Which ever state it is that forms the image is normally referred to as the ON state.

For discussion purposes, the ON state forming the image will be assumed to be the transferring state. Therefore, elements that are locked in the transferring state will be referred to as ON defects and elements locked in the non-transferring state will be referred to as OFF defects. If one were using a spatial light modulator with ON defects, errors would appear in the image consisting of black dots or stripes where there were supposed to be none. For some photosensitive surfaces and development processes, this effect is reversed. For discussion purposes, the ON defect will be assumed to create black dots or stripes as discussed above.

For example, in a typical printing process, the photosensitive drum would receive light at an area it was not supposed to. The toner would then be attracted to that area and form a dot or stripe. The final printed image would then have this dot or strip in what should have been a blank spot on the paper. Similarly for OFF defects, the paper would be white where a dot of toner was supposed to be.

One method used in conjunction with spatial light modulators is phase printing for pixels. In this method, each resulting pixel on the final image is printed in phases, with each phase being a smaller portion of the final pixel. This concept is discussed in further detail in U.S. Pat. No. 5,461,411, titled "Process and Architecture for Digital Micromirror Printer." While that application appears restricted to the digital micromirror type of spatial light modulators, it is actually applicable to any spatial light modulator array.

An example of a "phased" pixel is shown in FIG. 1. The pixel has a total width of 1/600th of an inch. In this example, it is printed in 4 phases, each the same size. The number of phases printed per pixel is only limited by the memory capabilities and the speed of the system relative to the speed of the moving photosensitive surface.

One method of implementing these phases is through the use of a look-up table, which translates the gray shade desired into the exposure level for each phase needed to achieve that desired exposure level. If, for example, a pixel was to have an gray level of 10, the four phases may have the exposure values respectively of 20, 16, 14 and 13.

Using phase 1, the exposure level 20, and assuming a defect free spatial light modulator, one can calculate the bit pattern to achieve this value. In addition to modulating the data, the light source is typically modulated by its power. An exposure of 8 will be assumed to represent full power, 4 half power, etc., down to 1. With an exposure sequence of:

8 8 8 8 8 8 4 2 1, the values to achieve 20 would be:

1 1 0 0 0 0 1 0 0, or 8+8+4=20.

The system controller of the printing system could derive this sequence in several ways. The controller could sequentially allocate bits until it achieves the desired cumulative exposure. Additionally, it could achieve it by using linear programming techniques, where the goal is to minimize the equation: $a_1x_1+a_2x_2+a_3x_3+ \ldots +a_nx_n-b$, where a is the exposure pattern set and b is the desired cumulative exposure, $x_i$ is the state (ON=1, OFF=0) of the mirror that exposes the pixel, and $a_i$ is the light intensity of that exposure.

The controller can also compensate for defects using the above techniques. Given the above exposure sequence, 8 8 8 8 8 4 2 1, assume that it has the defects as shown in below. (B represents an OFF defect and W represents an ON defect and N represents no defects, with B and W standing for Black and White, respectively). The resulting data from these defects has a fixed 0 at the first and last 8-power exposures and fixed 1 at the second 8-power exposure and the 2-power exposure.

| Exposure Sequence | 8 8 8 8 8 8 4 2 1 |
|---|---|
| Defect Map | B W N N N B N W N |
| Resulting Data Values | 0 1 x x x 0 x 1 x. |

This pattern has a set value of 10, with fixed 1s at 8 and 2, 8+2=10. Therefore, in order to approximate 20, it would be necessary to subtract the already existing exposure from the desired exposure, 20-10. The remaining bits would then need to be set to approximate 10, for a cumulative exposure of 20.

| Exposure Sequence | 8 8 8 8 8 8 4 2 1 |
|---|---|
| Defect Map | B W N N N B N W N |
| Resulting Data Values | 0 1 1 x x 0 x 1 1. |

The resulting approximation would be 8+8+2+1, or 19. However, this still results in the areas on the final image that are not to be developed being developed with an exposure level of 10.

Setting a predetermined background exposure level equal to the defects allows the ON defects to be screened out by the EP process. For example, in the above case the background exposure level would equal 10. The discussion started with the assumption that the four phases would have the exposure levels 20, 16, 14 and 13. By adding 10 to those exposure levels, making them 30, 26, 24 and 23, and getting the closest approximation, if not the exact value, the added 10 can be screened out at by the EP process threshold. The EP process is adjusted so that the toner or developer only develops those parts of the final image that have a cumulative exposure beyond exposure level 10.

Each printer could be loaded with the appropriate background level already determined and set, depending upon the defect map on the spatial light modulator. Also, the printer could be configured with a sensor so it could dynamically determine the defect map at power up, giving it a more up to date profile of the defects for which it needs to compensate, for both ON and OFF defects.

OFF defects are inherently compensated in this process, by allocating the bits that have OFF defects to the other elements available. For example, in the above case, where two 8-power exposure have OFF defects, other 8-power exposures are used. However, in the above sequence, only the 8-power has redundant exposures. It alleviates the approximation difficulties if all exposure powers have redundancies, in case one has an OFF defect.

Redundant exposures also increase the fit of the approximated value to the exact value, since it allows use of exposure powers that are not available in the other approximations. For example, suppose one is trying to approximate 24 with a different defect map than the one used above.

| Exposure Sequence | 8 8 8 8 8 8 4 2 1 |
|---|---|
| Defect Map | N N N N N B W N N |

Since 4 has an ON defect, the remaining cumulative exposure to be accomplished is 20. Because the 4-power exposure is unavailable, the closest approximation of the cumulative exposure is 19, 8+8+1+2. However, if the exposure sequence were changed to include redundancies:

| Exposure Sequence | 8 8 8 8 8 8 4 4 2 2 1 1 |
|---|---|
| Defect Map | N N N N N N W N N N N N | and the total exposure desired is still 24, the approximation of the remaining 20 would be 8+8+4=20. The defect compensation method can be implemented as a computational process or by using look-up tables.

Figure 2:
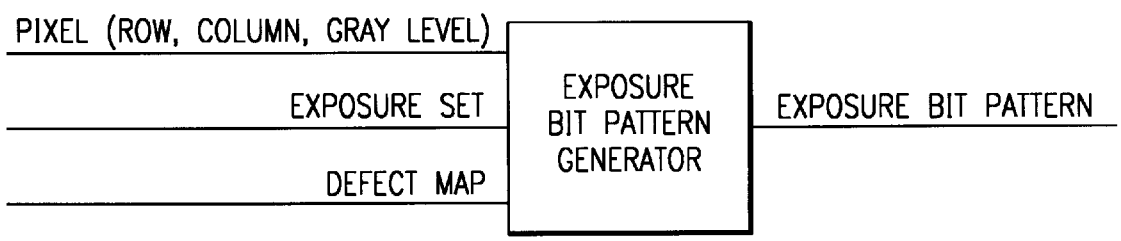
FIG. 2 shows a block diagram representation of a defect correction module.

An example of a defect correction module is shown in FIG. 2. The input necessary is the location (row and column) and exposure level desired for a given pixel, the defect map, and the background exposure set. The output is the exposure bit pattern for that pixel.

While the above example started off with an example of a phased modulator, the above techniques could be used with any modulator. The module of FIG. 2 could be added to any type of printing process using individual elements on an array to represent pixels in the image to compensate for defective elements.

Thus, although there has been described to this point particular embodiments of a method of printing with a defective spatial light modulator, it is not intended that such specific references be considered as limitations upon the scope of this invention except in-so-far as set forth in the following claims.

What is claimed is:

1. A method of printing using a spatial light modulator with ON defects, comprising the steps of:

a. generating a defect map of a spatial light modulator, wherein said defect map identifies elements with ON defects;

b. determining a minimum exposure level value to be added to all exposure level values, wherein a controller calculates said minimum exposure level value by determining the number and position of said ON defects in a column of said spatial light modulator;

c. using said spatial light modulator to generate a latent image on a photosensitive surface, such that said ON defects have been minimized by the addition of said minimum exposure level to all of said latent image; and d. controlling the electrophotographic development of said latent image such that said minimum exposure level is eliminated from a final printed image from said latent image.

* * * * *